(12) United States Patent
Yan et al.

(10) Patent No.: US 9,430,301 B2
(45) Date of Patent: Aug. 30, 2016

(54) DISTRIBUTED SYSTEM FOR DOWNLOADING INTERNET INFORMATION AND A METHOD THEREOF

(71) Applicants: Peking University Founder Group Co., Ltd., Beijing (CN); Peking University, Beijing (CN); Beijing Founder Electronics Co., Ltd., Beijing (CN)

(72) Inventors: Lei Yan, Beijing (CN); Xiao Liang, Beijing (CN); Xiaoming Yu, Beijing (CN); Jianwu Yang, Beijing (CN)

(73) Assignees: Peking University Founder Group Co., Ltd., Beijing (CN); Peking University, Beijing (CN); Beijing Founder Electronics Co., Ltd., Beijing (CN)

( * ) Notice: Subject to any disclaimer, the term of this patent is extended or adjusted under 35 U.S.C. 154(b) by 213 days.

(21) Appl. No.: 14/095,131

(22) Filed: Dec. 3, 2013

(65) Prior Publication Data

US 2014/0189062 A1    Jul. 3, 2014

(30) Foreign Application Priority Data

Dec. 28, 2012    (CN) .......................... 2012 1 0587234

(51) Int. Cl.
*H04L 12/24* (2006.01)
*G06F 9/54* (2006.01)

(52) U.S. Cl.
CPC ...................................... *G06F 9/54* (2013.01)

(58) Field of Classification Search
CPC .............................. G06F 9/54; H04L 41/0246
See application file for complete search history.

(56) References Cited

U.S. PATENT DOCUMENTS

| | | | |
|---|---|---|---|
| 2001/0016860 A1* | 8/2001 | Nosohara ............ | G06F 17/2872 715/264 |
| 2006/0004748 A1* | 1/2006 | Ramarathnam ... | G06F 17/30867 |
| 2010/0145977 A1* | 6/2010 | Brodfuehrer ..... | G06F 17/30637 707/769 |
| 2010/0169369 A1* | 7/2010 | Wang ................ | G06F 17/30038 707/770 |
| 2013/0211965 A1* | 8/2013 | Simkin .............. | G06Q 30/0629 705/26.64 |

* cited by examiner

*Primary Examiner* — Chris Parry
*Assistant Examiner* — Stephen Houlihan
(74) *Attorney, Agent, or Firm* — Fish & Richardson P.C.

(57) ABSTRACT

A distributed system for downloading distributed Internet information and a method thereof are disclosed. A distribution subsystem receives downloading task information from a user, and sends the downloading task information to a downloading subsystem. The downloading subsystem downloads task result information according to the downloading task information, and sends the task result information to the distribution subsystem. The distribution subsystem receives the task result information, and returns the task result information to the user made the request. The physical environment of the system can include a distribution server and a downloading subsystem group, the internal function of the system is to assign the required tasks to the downloading subsystem group based on a queue model, the downloading subsystem group can process the assigned tasks concurrently. The system and the method is adapt to a mass-data acquisition over Internet, which may significantly improve the efficiency and timeliness for obtaining information.

11 Claims, 3 Drawing Sheets

… (1)

DISTRIBUTED SYSTEM FOR DOWNLOADING INTERNET INFORMATION AND A METHOD THEREOF

CROSS-REFERENCE TO RELATED APPLICATIONS

The present application claims priority to Chinese Patent Application No. 201210587234.1 filed before the Chinese Patent Office on Dec. 28, 2012 and entitled "A Distributed System For Downloading Internet Information and A Method Thereof", which is incorporated herein by reference in its entirety.

TECHNICAL FIELD

This specification relates to computer technology, Internet data acquisition, and a distributed system for downloading information from Internet and a method thereof.

BACKGROUND

In accompany with the increasing of Internet popularization rate to all people, people get used to utilizing Internet to issue, obtain and transfer information day by day, the Internet has already become a main carrier of various information, and reflects the public subjective emotions to social reality to a certain extent. More often, there are a lot of websites reprinting and reporting hot issues over the Internet, it has become our new needs on how to use original machine resources more reasonable, and obtain more information in a certain time without increasing the processing performance of those original hardware resources.

Most of the present downloading models proceed downloading based on single task single-thread and multitask multi-threads, in which, when there is a task, a thread will start-up, then the information is received, obtained and returned. It is easier to understand and to operate such kind of models. When the task amount is not huge, the downloading can be well controlled by utilizing the thread(s), and it's easy to track the whole procedure for obtaining information. However, due to the fact that once a task is received, a thread needs to start-up to receive and perform the task, and there is a close relationship between the quantity of received tasks and the performance of the machine, one of the deficiencies of such model is consuming large amount of system resources, and having a higher requirement to the machine.

SUMMARY

Innovative aspects of the subject matter described in this specification provide a distributed system for downloading Internet information and a method thereof, which is used to significantly increase the efficiency of downloading information.

In order to realize above-mentioned objects, the following technical solutions are employed:

In some implementations, a distributed system for downloading Internet information, can include: a distribution subsystem, configured to receive and transmit user's downloading task information, and return task result information to the user; and at least a downloading subsystem, configured to receive the downloading task information sent by the distribution subsystem and download the task result information according to the downloading task information.

Further, the distributed system for downloading Internet information as mentioned above, wherein the distribution subsystem is disposed in a distribution server, the downloading subsystem is disposed in one or more workstations.

Further, the distributed system for downloading Internet information as mentioned above, wherein the distribution subsystem comprises:

a distribution memory module, configured to apply to the distribution server for a distribution memory space for saving downloading task information and the task result information;

a task receiving module, configured to receive a downloading task request from a user and save downloading task information corresponding to the received downloading task in the distribution memory space;

a distribution module, configured to send downloading task information to the downloading subsystem;

a result receiving module, configured to receive the task result information returned by the downloading subsystem, and save the task result information in the distribution memory space;

a distribution returning module, configured to return the task result information to the user.

Further, the distributed system for downloading Internet information as mentioned above, wherein the downloading subsystem can include:

a downloading memory module, configured to apply to the workstation for downloading memory space to save the downloading task information and the task result information;

a receiving module, configured to receive downloading task information distributed by the distribution subsystem, and save the downloading task information in the downloading memory space;

a downloading module, configured to download Internet data according to the downloading task information, generates the task result information, and saves the task result information in the downloading memory space;

a downloading returning module, configured to return the task result information to the distribution subsystem.

Further, the distributed system for downloading Internet information as mentioned above, wherein the distribution subsystem can also include:

a verifying module, configured to analyze and verify the validity of the downloading task information received by the task receiving module and the task result information received by the result receiving module;

a monitoring module, configured to monitor a distributing condition of the downloading task information, if the distributing of the downloading task information has been completed or overtime, the monitoring module notifies the distribution memory module to delete the downloading task information and withdraw the distribution memory space.

Further, the distributed system for downloading Internet information as mentioned above, wherein the downloading subsystem can include:

an analyzing module, configured to analyze and verify the validity of the downloading task information received by the receiving module.

In some implementations, a method for distributed downloading Internet information, includes the following steps:

(1) a distribution subsystem receives downloading task information from a user, and sending the downloading task information to a downloading subsystem;

(2) a downloading subsystem downloads Internet data according to the downloading task information, generates a task result information, and sends the task result information to the distribution subsystem;

(3) a distribution subsystem receives the task result information, and returns the task result information to the user who made the request.

Further, the method for distributed downloading Internet information as mentioned above, in step (1), the step of the distribution subsystem sending the downloading task information to a downloading subsystem can include:

(1-1) a distribution memory module applying for a distribution memory space;

(1-2) a task receiving module receiving a downloading task requested from a user, and saving downloading task information corresponding to the received downloading task in the distribution memory space;

(1-3) a distribution module searching the downloading task information in the distribution memory space, and sending the downloading task information to the downloading subsystem.

Further, the method for distributed downloading Internet information as mentioned above, the step of a downloading subsystem downloading task result information according to the downloading task information and sending the task result information to the distribution subsystem can include:

(2-1) a downloading memory module applies for downloading memory space;

(2-2) a receiving module receives downloading task information distributed by the distribution subsystem, and saves the downloading task information in the downloading memory space;

(2-3) a downloading module downloads Internet data according to the downloading task information, generates task result information, and saves the task result information in the downloading memory space;

(2-4) a downloading returning module returns the task result information in the downloading memory space to the distribution subsystem.

The beneficial effects achieved methods, systems, and computer storage media herein include: the system and method mentioned in the present invention proceed Internet information downloading based on a distributed architecture, the distribution subsystem distributes the downloading tasks and returns the downloading results, and the downloading subsystem obtains Internet information, it is possible to realize the information collecting and downloading with the maximum efficiency in a certain time utilizing fewer machine resources.

DETAILED DESCRIPTION

The subject matter of this specification will be described in detail with reference to the figures and implementations disclosed below.

The system disclosed includes a distributed system that simultaneously acquires Internet information based on a network platform, the physical environment of the system can include a distribution server and a downloading subsystem group, the internal function of the system is to assign the requested tasks to the downloading subsystem group based on a queue model, and the downloading subsystem group is able to simultaneously process the assigned tasks. The system can be applied to a situation on mass-data acquisition over the Internet and a work environment having a certain requirements on the efficiency and timeliness of obtaining information.

Figure 1:
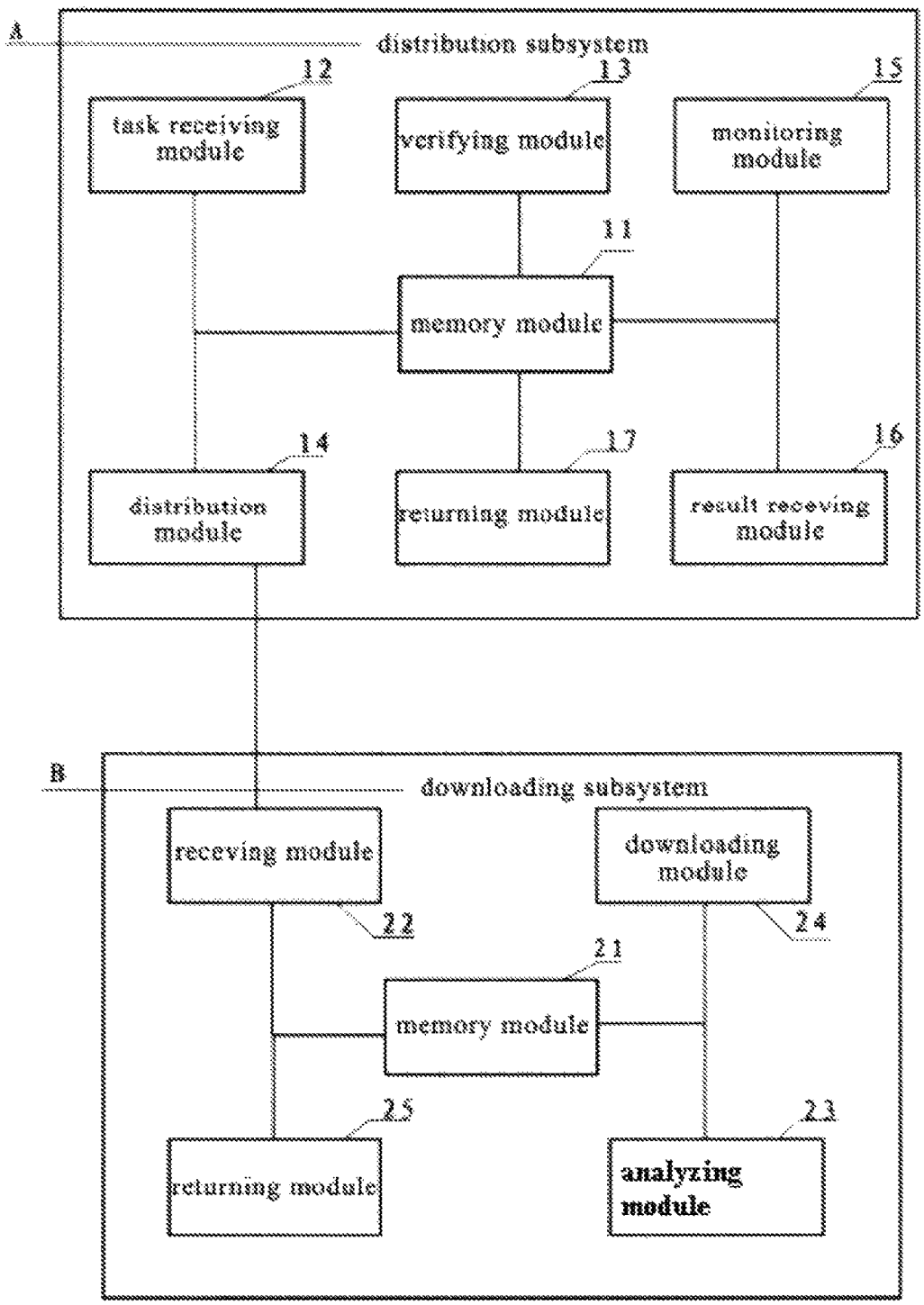
FIG. 1 is a schematic block diagram of an example distributed system for downloading Internet information.

FIG. 1 is a schematic block diagram of an example distributed system 100 for downloading Internet information. It can be seen in the diagram that the system 100 contains two kinds of subsystems, i.e., the distribution subsystem A and the downloading subsystem B. The distribution subsystem A mainly takes charge of receiving, sending and returning task bags, while the function of the downloading subsystem B is relatively single, which just takes charge of receiving tasks distributed by the distribution subsystem A, then downloads Internet information requested in the downloading tasks, and finally transmits the downloaded contents to the distribution subsystem A.

The distribution subsystem A in the present example can include a memory module 11, a task receiving module 12, a verifying module 13, a distribution module 14, a monitoring module 15, a result receiving module 16 and a returning module 17; the downloading subsystem B can include a memory module 21, a receiving module 22, an analyzing module 23, a downloading module 24 and a returning module 25. In order to distinguish the modules between the distribution subsystem A and the downloading subsystem B, in the present example, the modules which are similar to those in the downloading subsystem B are named "distribution+module name" in the distribution subsystem A, and named "downloading+module name" in the downloading subsystem B, for example, in A, the memory module 11 is named distribution memory module, the returning module 17 is named distribution returning module, whereas, in B, the memory module 21 is named downloading memory module, the returning module 25 is named downloading returning module. Wherein:

The distribution memory module 11 is used to apply to the distribution server for a distribution memory space for saving downloading task information and task results information;

The task receiving module 12 is used to receive a downloading task request from a user and save downloading task information corresponding to the received downloading task in the distribution memory space;

The verifying module 13 is used to analyze and verify the validity of downloading task information received by the task receiving module 12 and task result information received by the result receiving module 16;

The distribution module 14 is used to obtain downloading task information from the distribution memory module 11 and send downloading task information to the downloading subsystem B;

The monitoring module 15 is used to monitor the distributing condition of downloading task information; if the distributing of downloading task information is finished or overtime, the monitoring module 15 notifies the distribution memory module 11 to delete the downloading task information and withdraw the memory space;

The result receiving module 16 is used to receive the task result information returned by the downloading subsystem B, and save the task result information in the distribution memory space;

The distribution returning module 17 is used to return the task result information to the user.

The downloading memory module 21 is used to apply to a workstation for a downloading memory space to save the downloading task information and the task result information;

The receiving module 22 is used to receive the downloading task information distributed by the distribution subsystem A, and save the downloading task information corresponding to the received downloading task in the downloading memory space;

The analyzing module 23 is used to analyze and verify the validity of the downloading task information received by the receiving module 22;

The downloading module 24 is used to download Internet data according to the downloading task information, generate task result information, and save the task result information in the downloading memory space;

The downloading returning module 25 is used to return the task result information to the distribution subsystem A.

The internal function of the system described in the present example is to assign the requested tasks to the downloading subsystem group based on a queue model, the downloading subsystem can simultaneously process the received tasks. Therefore, each one of the modules mentioned above, except the task receiving module 12, the result receiving module 16 and the verifying module 13 as well as the receiving module 22 and the analyzing module 23, has a queue respectively, namely, each one of the distribution memory module 11, the distribution module 14, the distribution returning module 17, the monitoring module 15, the downloading memory module 21, the downloading module 24 and the downloading returning module 25 saves the received data, which includes downloading task information, task result information, a distribution task number, a task result number, etc., in the form of a corresponding queue respectively.

The task receiving module 12 saves downloading task information into a distribution memory queue of the distribution memory module 11 after received the downloading task information. The task receiving module 12 creates a unique distribution task number for each piece of the downloading task information, then sends the distribution task number to the verifying module 13. The verifying module 13 sends a distribution task number of the legal downloading task information to the distribution module 14 after verified the downloading task information. The distribution module 14 saves the distribution task number into a distribution queue. When the distribution module 14 sends downloading task information to the downloading subsystem B, the distribution module 14 takes out the distribution task number corresponding to the downloading task information in the distribution queue, and finds a downloading task information corresponding to the distribution task number, then sends the downloading task information to the downloading subsystem B. After the verifying module 13 verified the downloading task information, the verifying module 13 also sends a distribution task number of legal downloading task information to the monitoring module 15. The monitoring module 15 saves the distribution task number in a monitoring queue. The monitoring module 15 keeps monitoring the downloading task information corresponding to the first distribution task number in the monitoring queue, to see if it has been finished or overtime, if it is finished or overtime, the first distribution task number in the monitoring queue is deleted directly, and the downloading task information corresponding to this distribution task number in the distribution memory queue is deleted as well, and the monitoring module 15 withdraws the distribution memory space corresponding to the distribution task number in the distribution memory queue. After the task result information is returned by the downloading subsystem B to the distribution subsystem A, firstly, the verifying module 13 verifies the task result information, then searches the downloading task information and the distribution memory queue thereof corresponding to the distribution task number in the distribution memory module 11 according to the distribution task number of the task result information, the task result information is saved into the distribution memory queue, and the distribution task number of the task result information is sent to the distribution returning module 17. The distribution returning module 17 saves the distribution task number in the distribution returning queue. When the distribution returning module 17 returns the task result information to a user, the distribution returning module 17 takes out the distribution task number in the distribution returning queue, searches the task result information corresponding to this distribution task number in the distribution memory queue, and returns the task result information back to the user.

After the receiving module 22 receives the downloading task information distributed by the distribution subsystem A, the receiving module 22 saves the received downloading task information in the downloading memory queue of the downloading memory module 21. And the analyzing module 23 verifies the validity of downloading task information. If it is legal, a unique downloading task number in the downloading subsystem is created for each piece of the downloading task information, and the downloading task number is sent to the downloading queue of the downloading module 24; if it is illegal, the downloading task is unavailable. While the downloading module 24 downloading the task result information, the downloading module 24 takes out the downloading task number in the downloading queue, and searches the downloading task information in the downloading memory queue according to the downloading task number, downloads Internet data according to the downloading task information, and generates the task result information, then saves the task result information in the downloading memory queue, and sends the downloading task number to the downloading returning queue of the downloading returning module 25, and deletes the downloading task number in the downloading queue. When the downloading returning module 25 returns the task result information to the distribution subsystem A, the downloading returning module 25 takes out the downloading task number from the downloading returning queue, finds out the task result information corresponding to the downloading task number in the downloading memory queue, and returns the task result information to the distribution subsystem A, and deletes the downloading task number in the downloading loop back queue, at the same time, the downloading returning module 25 notifies the downloading memory module 21 to withdraw the downloading memory space occupied by the task result information.

A description for the working flow of the distribution subsystem A and the downloading subsystem B will be made below:

Each module of the distribution subsystem A functions according to the following steps:

First, when the system start-up, the system firstly enters into the distribution memory module 11, a certain amount of memory for managing tasks is applied to this module. In this step, the system supports a user to define a size of tasks can be stored at the same time in the memory according to performance of the physical environment and the required speed of processing tasks simultaneously.

2. Monitoring a request from a user. After distributed the memory, the system will enter into the task receiving module 12 to monitor a task receiving port, if there is a user's request received, a monitor thread in this module will be triggered, and the thread will directly invoke the task receiving module 12.

3. The task receiving module 12 is specially in charge of receiving task request information. When a task connects to the distribution subsystem A and the system enters into this module, because it needs to save information on executed task, a front most memory block is firstly picked out from the distribution memory queue, and a unique task number for the task information is created, then the information and the unique task number are both transferred to the verifying module 13.

4. To this step, the verifying module 13 in the distribution subsystem A has already obtained task information, the system needs to verify the information. In order to determine the integrity and validity of the information, the information will be analyzed in the verifying module 13. After the information is determined as legal, the main task of the verifying module 13 is finished. To the next, the number of legal information is input into the monitoring module 15 and the distribution module 14.

5. If there is a task number in the distribution queue of the distribution module 14, the distribution module 14 will take out the task number from the distribution queue, then searches the downloading task information in the distribution memory queue. The distribution module 14 sends the acquired downloading task information to the downloading subsystem B. After sending the downloading task information, the task number in the distribution queue will be removed from the distribution queue, and the task number is no longer saved.

6. The monitoring module 15 keeps inspecting the achievement of the first task in the monitoring queue. Due to all the tasks in the monitoring queue are inputted in order, so that only the first task in the monitoring queue needs to be monitored. While the first task being overtime or finished, the first task will be directly deleted, and at the same time, the space in the distribution memory queue is withdrawn, then the monitoring module 15 keeps on monitoring the next task.

7. The result receiving module 16 finishes the step of receiving task result information when the downloading subsystem B returns the task result information. After the result receiving module received the task result information returned by the downloading subsystem B, the verifying module 13 will be invoked to judge the integrality of the task result information. If the information is correct, the task result will be stored in the distribution memory queue, and the task number will be deposited in the distribution returning queue.

8. A responsibility of the distribution returning module 17 is to send the task result information to an address specified in the task, which will be referred to as a returning address. When the distribution returning queue is not empty, the distribution returning module 17 will take out a task number in the distribution returning queue, then finds out corresponding information in distribution memory queue, finally sends the task result to the returning address and marks the task as already been finished.

The workflow of the downloading subsystem B:

1. First of all, the downloading memory module 21 will apply for a certain amount of memory space for storing task information. The size of the space is determined based on the physical machine performance of the subsystem and the speed of the network. The applied space is stored in the form of a queue as well.

2. After the distribution subsystem A is assigned a task, the receiving module 22 will receive downloading task information, then a memory space will be taken out from the downloading memory module 21 to store the downloading task information.

3. The analyzing module 23 analyzes the newly received task information to determine whether it is legal, if the task information is legal, a unique task number in the subsystem will be created for the task, and the task number will be put in the downloading queue of the downloading module 24. Otherwise, this task will be considered as unavailable and be discarded.

4. When there is data in the downloading queue of the downloading module 24, the downloading module 24 will take out the task number in the downloading queue, and find out task information in the downloading memory queue. According to the content of the task, the downloading module 24 will download required data. After downloading is finished, the received content will be stored into the downloading memory queue directly. The task number is deleted in the downloading queue, and the task number is put into the downloading returning queue of the downloading returning module 25.

5. When the downloading returning queue is not empty, the downloading returning module 25 is triggered. The downloading returning module 25 directly takes out the task number from the downloading returning queue, and reads corresponding information from the downloading memory queue of the memory module 21, directly returns the task information to the distribution subsystem A. After returning finished, the downloading returning module 25 will delete the task number in the downloading returning queue, and notify the downloading memory module 21 to withdraw the space occupied by this task for later use.

Figure 2:
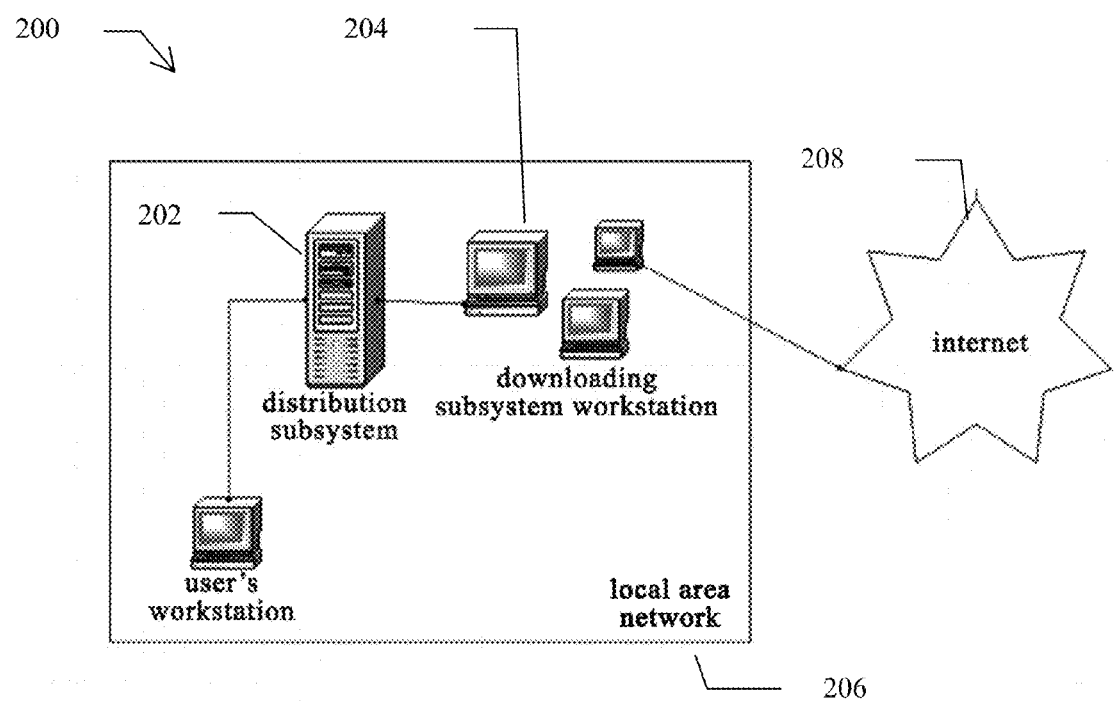
FIG. 2 is a schematic diagram showing an example distributed system for downloading Internet information.

The system described includes at least a distribution server used to install the distribution subsystem and one or more workstations used to install the downloading subsystem(s), as shown in FIG. 2. Wherein the distribution subsystem 202 and downloading subsystem(s) 204 are located in one local area network 206, and may perform bidirectional communications between each other, and users are in the same local area network as well; the distributed workstation(s) must be able to connect to Internet 208 and capable of freely obtaining Internet resources.

Figure 3:
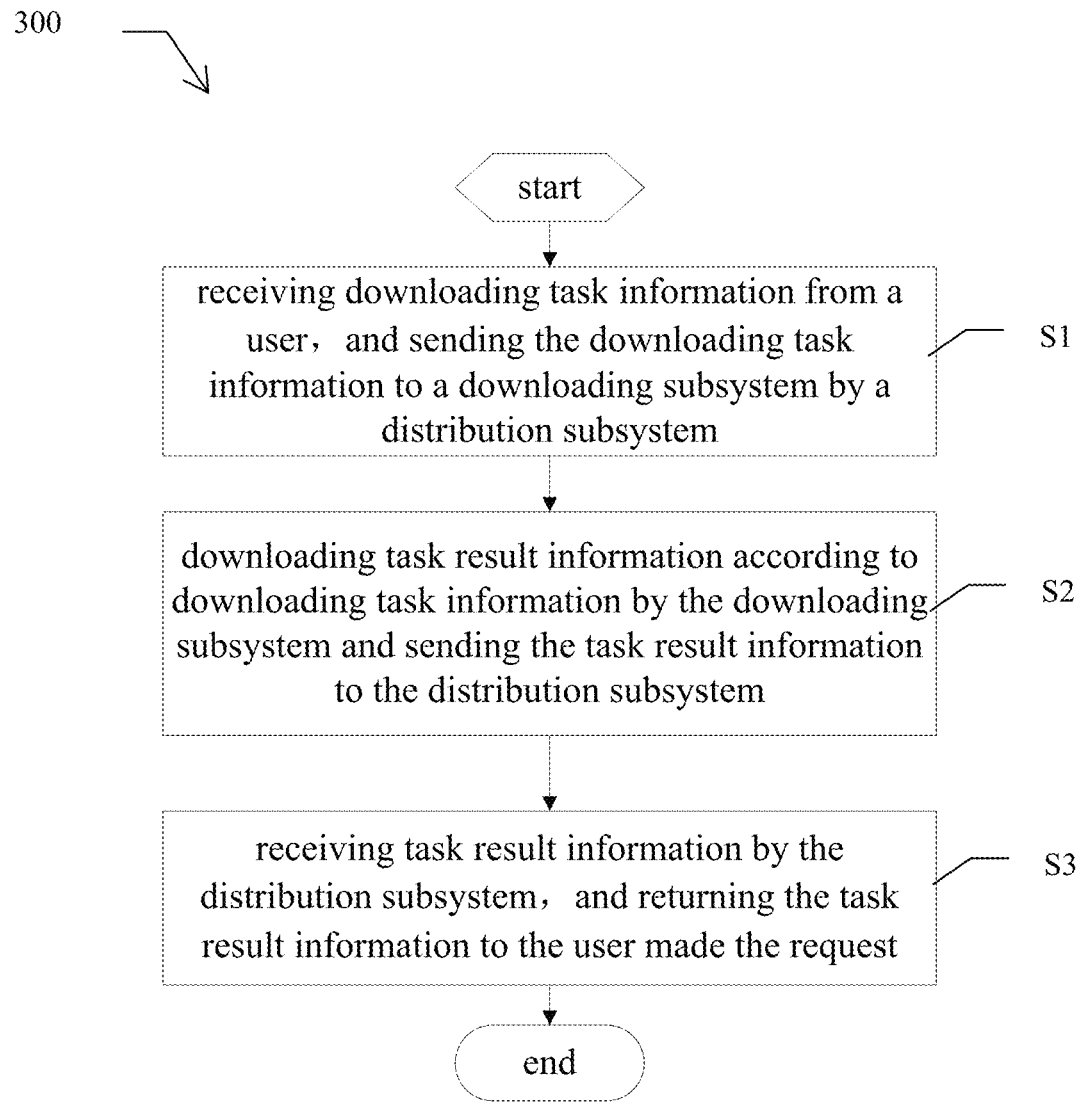
FIG. 3 is a flow chart of an example method for distributed downloading Internet.

FIG. 3 shows a flowchart of an example method 300 for distributed downloading Internet information. The method 300 can be implemented, for example, by the system 100 illustrated in FIG. 1.

In step S1 a distribution subsystem receives downloading task information from a user, and sends the received downloading task information to a downloading subsystem.

The detailed steps of carrying out the step S1 can include the following:

1) a distribution memory module that applies for a distribution memory space;

2) a task receiving module that receives a downloading task request from a user, and saves downloading task information corresponding to the received downloading task in the distribution memory space; and 3) a distribution module that searches the downloading task information in the distribution memory space, and sends the downloading task information to the downloading subsystem.

Step S2 includes the downloading subsystem downloading Internet data according to the downloading task information, generating task result information, and sending the task result information to the distribution subsystem.

The detailed steps for carrying out the step S2 can include the following:

1) downloading memory module applies for a downloading memory space;

2) receiving module receives the downloading task information distributed by distribution subsystem, and saves downloading task information in the downloading memory space;

3) the downloading module downloads Internet data according to the downloading task information, generates task result information, and saves the task result information in the downloading memory space; and 4) the downloading returning module returns the task result information in the downloading memory space to the distribution subsystem.

In step S3 the distribution subsystem receives the task result information, and returning the task result information to the user made the request.

The detailed steps for carrying out the step S3 can include the following:

1) the result receiving module receives the task result information returned by the downloading subsystem, and saves the task result information in the distribution memory space; and 2) the distribution returning module returns the task result information from the distribution memory space to the user.

Example implementations have been described above with reference to the accompanying drawings. A person skilled in the art should understand that the above examples are only cited examples for illustrative purposes, instead of for restricting, any modification, equivalent replacement, etc. which is made in the scope of the protection of the teachings and claims of the present application, should be included within the scope of the protection claimed by this application.

What is claimed is:

1. A distributed system for downloading Internet information, comprising:
   a distribution server and a plurality of downloading subsystem workstations;
   wherein the downloading subsystem workstations are distributed over an internet and in communication with the distribution server through a local area network:
   wherein the distribution server is configured to receive downloading task information from a user, assign corresponding tasks to the downloading subsystem workstations, respectively, according to the downloading task information based on a queue model, and return task result information to the user; and
   the downloading subsystem workstations are configured to receive the corresponding tasks assigned by the distribution server, respectively, simultaneously download internet data corresponding to the corresponding tasks, and return the internet data corresponding to the corresponding tasks to the distribution server;
   wherein all the internet data corresponding to the corresponding tasks forms the task result information;
   wherein a processor of the distribution server is further configured to:
   monitor distributing of the corresponding tasks assigned to the downloading subsystem workstations, respectively, if the distributing of the corresponding tasks assigned to the downloading subsystem workstations, respectively, is completed or overtime, delete the corresponding tasks assigned to the downloading subsystem workstations, respectively, and withdraw the distribution memory space; and
   save the corresponding tasks assigned to the downloading subsystem workstations in a distribution memory queue, and create a unique distribution task number for each piece of the corresponding tasks assigned to the downloading subsystem workstations; and
   analyze and verify validity of the downloading task information and the task result information.

2. The distributed system for downloading Internet information according to claim 1, wherein each of the downloading subsystem workstations comprises: a processor which is configured to,
   allocate a downloading memory space for storing the corresponding task assigned to the each of the downloading subsystem workstations by the distribution server and the internet data corresponding to the corresponding task assigned to the each of the downloading subsystem workstations by the distribution server;
   receiving module, configured to receive the corresponding task assigned to the each of the downloading subsystem workstations, and save the corresponding task assigned to the each of the downloading subsystem workstations in the downloading memory space;
   to download the Internet data according to the corresponding task assigned to the each of the downloading subsystem workstations and save the internet data corresponding to the corresponding task assigned to the each of the downloading subsystem workstations in the downloading memory space; and
   return the internet data corresponding to the corresponding task assigned to the each of the downloading subsystem workstations to the distribution server.

3. The distributed system for downloading Internet information according to claim 2, wherein the processor of the each of the downloading subsystem workstations is further configured to:
   analyze and verify the validity of the corresponding task assigned to the each of the downloading subsystem workstations by the distribution server.

4. The distributed system for downloading Internet information according to claim 3, wherein, the processor of the each of the downloading subsystem workstations is further configured to,
   save the corresponding task assigned to the each of the downloading subsystem workstations in a downloading memory queue, and verify the validity of the corresponding task assigned to the each of the downloading subsystem workstations, if the corresponding task assigned to the each of the downloading subsystem workstations is legal, create a unique downloading task number in the each of the downloading subsystem workstations for each piece of the corresponding task assigned to the each of the downloading subsystem workstations; if the corresponding task assigned to the each of the downloading subsystem workstations is illegal, not perform the corresponding task assigned to the each of the downloading subsystem workstations.

5. The distributed system for downloading Internet information according to claim 1, wherein each of the downloading subsystem workstations comprises a processor which is configured to analyze and verify the validity of the corresponding task assigned to the each of the downloading subsystem workstations by the distribution server.

6. The distributed system for downloading Internet information according to claim 1, wherein, the processor of the distribution server is further configured to, after verifying the corresponding tasks assigned to the downloading subsystem workstations, save the distribution task numbers of the corresponding tasks assigned to the downloading subsystem workstations in a distribution queue; and take out one of the distribution task numbers in the distribution queue when sending the corresponding tasks assigned to the downloading subsystem workstations to the downloading subsystem workstations, find out one of the corresponding tasks assigned to the downloading subsystem workstations corresponding to the one of the distribution task numbers, and send the one of the corresponding tasks assigned to the downloading subsystem workstations to the corresponding downloading subsystem workstation.

7. The distributed system for downloading Internet information according to claim 1, wherein, the processor of the distribution system is further configured to, after verifying the corresponding tasks assigned to the downloading system workstations, save the distribution task numbers in a monitoring queue; and monitor one of the corresponding tasks assigned to the downloading subsystem workstations corresponding to the first distribution task number in the monitoring queue all the time, and determine if it is finished or overtime, if so, directly delete the first distribution task number in the monitoring queue is deleted directly, and delete the one of the corresponding tasks assigned to the downloading subsystem workstations corresponding to the first distribution task number in the distribution memory queue, and withdraw the distribution memory space in the distribution memory queue corresponding to the first distribution task number.

8. A method for distributed downloading Internet information by using a distributed system for downloading Internet information, wherein the distributed system for downloading Internet information comprises a distribution server and a plurality of downloading subsystem workstations; the downloading subsystem workstations are distributed over an internet and in communication with the distribution server through a local area network;

the method comprising steps:
(1) receiving, by the distribution server, downloading task information from a user, assigning, by the distribution server, corresponding tasks to the downloading subsystem workstations, respectively, according to the downloading task information based on a queue model;
(2) saving the corresponding tasks assigned to the downloading subsystem workstations in a distribution memory queue, and creating a unique distribution task number for each piece of the corresponding tasks assigned to the downloading subsystem workstations;
(3) monitoring distribution of the corresponding tasks assigned to the downloading subsystem workstations, respectively, if the distribution of the corresponding tasks assigned to the downloading subsystem workstations, respectively, is completed or overtime, delete the corresponding tasks assigned to the downloading subsystem workstations, respectively, and withdraw the distribution memory space;
(4) simultaneously downloading, by the downloading subsystem workstations, Internet data corresponding to the corresponding tasks, and return the internet data corresponding to the corresponding tasks to the distribution server;
(5) receiving, by the distribution server, the internet data corresponding to the corresponding tasks, generating task result information based on all the internet data corresponding to the corresponding tasks, and returning the task result information to the user made the request; and
(6) analyzing and verifying validity of the downloading task information and the task result information.

9. The method for distributed downloading Internet information according to claim 8, wherein, the assigning, by the distribution server, corresponding tasks to the downloading subsystem workstations, respectively, according to the downloading task information based on a queue model comprises:
(1-1) allocating, by the distribution server a distribution memory space;
(1-2) receiving, by the distribution server, the downloading task information from the user, and saving the downloading task information in the distribution memory space; and
(1-3) searching, by the distribution server, the downloading task information in the distribution memory space, and sending, by the distribution server, corresponding tasks to the downloading subsystem workstations, respectively, according to the downloading task information based on the queue model.

10. The method for distributed downloading Internet information according to claim 9, wherein, simultaneously downloading, by the downloading subsystem workstations, Internet data corresponding to the corresponding tasks, and return the internet data corresponding to the corresponding tasks to the distribution server comprises:
(2-1) allocating, by each of the downloading subsystem workstations a downloading memory space;
(2-2) receiving, by each of the downloading subsystem workstations, the corresponding task assigned to the each of the downloading subsystem workstations, and saving the corresponding task assigned to the each of the downloading subsystem workstations in the downloading memory space;
(2-3) downloading, by each of the downloading subsystem workstations, the Internet data according to the corresponding task assigned to the each of the downloading subsystem workstations, and saving the internet data corresponding to the corresponding task assigned to the each of the downloading subsystem workstations in the downloading memory space; and
(2-4) returning, by each of the downloading subsystem workstations, the internet data corresponding to the corresponding task assigned to the each of the downloading subsystem workstations in the downloading memory space to the distribution server.

11. The method for distributed downloading Internet information according to claim 10, wherein, receiving, by the distribution server, the internet data corresponding to the corresponding tasks, generating task result information based on all the internet data corresponding to the corresponding tasks, and returning the task result information to the user comprises:
(3-1) receiving, by the distribution server, the internet data corresponding to the corresponding tasks returned by the downloading subsystem workstations, and saving the internet data corresponding to the corresponding tasks in the distribution memory space as the task result information; and (3-2) returning, by the distribution server, the task result information in the distribution memory space to the user.

\* \* \* \* \*